United States Patent [19]

Lenhart

[11] Patent Number: 4,560,060

[45] Date of Patent: Dec. 24, 1985

[54] VACUUM BELT CONVEYOR

[75] Inventor: Ronald A. Lenhart, Lakewood, Colo.

[73] Assignee: Precision Metal Fabricators, Inc., Arvada, Colo.

[21] Appl. No.: 593,267

[22] Filed: Mar. 26, 1984

Related U.S. Application Data

[63] Continuation-in-part of Ser. No. 583,694, Feb. 27, 1984, which is a continuation-in-part of Ser. No. 543,271, Oct. 17, 1983, which is a continuation-in-part of Ser. No. 514,590, Jul. 18, 1983.

[51] Int. Cl.[4] .............................................. B65G 47/91

[52] U.S. Cl. ................................ 198/803.5; 198/453; 209/643; 209/905

[58] Field of Search ............... 198/380, 398, 689, 811, 198/453, 443, 840; 209/643, 707, 905, 940

[56] References Cited

U.S. PATENT DOCUMENTS

| | | | |
|---|---|---|---|
| 722,252 | 3/1903 | Richards | 198/840 X |
| 938,511 | 11/1909 | Purple | 24/31 H |
| 21,45,455 | 1/1939 | Olsen | 24/33 P |
| 2,941,563 | 6/1960 | Kriemelmeyer, Jr. | 198/689 X |
| 3,185,284 | 5/1965 | Molins | 198/689 X |
| 3,352,404 | 11/1967 | Settembrini | 198/689 X |
| 3,592,329 | 7/1971 | Fleischauer | 198/689 X |
| 3,664,483 | 5/1972 | Revaz | 198/449 |
| 4,105,398 | 8/1978 | Disch et al. | 198/453 X |
| 4,136,767 | 1/1979 | Sarovich | 198/689 |
| 4,146,467 | 3/1979 | Sauer et al. | 209/643 |
| 4,304,508 | 12/1981 | Wolf | 198/689 X |

*Primary Examiner*—Leslie J. Paperner
*Assistant Examiner*—Jonathan D. Holmes
*Attorney, Agent, or Firm*—Fields, Lewis, Pittenger & Rost

[57] ABSTRACT

An apparatus for the movement of articles in a predetermined upright position from a first station to a second station, spaced from the first station, by a foraminous transfer belt. A vacuum plenum has a wall against the back side of the transfer belt with spaced longitudinal slots therein so that maximum vacuum is drawn in the plenum through jet openings in the belt which is sufficient to just lift and support properly oriented articles from the first station and transfer them to the second station. The transfer belt can be run at a higher speed than that with which articles are supplied to the first station to space articles longitudinally along the transfer belt. The second station includes a conveyor with converging side walls for moving the separated containers into single file arrangement over a much shorter longitudinal distance than would otherwise be possible.

8 Claims, 14 Drawing Figures

VACUUM BELT CONVEYOR

This application is a continuation-in-part of my co-pending application, U.S. Ser. No. 583,694, filed Feb. 27, 1984, which is a continuation-in-part of my co-pending application, U.S. Ser. No. 543,271, filed Oct. 17, 1983, which in turn is a continuation-in-part of my co-pending application, U.S. Ser. No. 514,590, filed July 18, 1983 and entitled "Vacuum Transfer Conveyor". This application is also related to my co-pending application, U.S. Ser. No. 533,225, filed Sept. 19, 1983, and entitled "Vertical Single Filer Conveyor System".

TECHNICAL FIELD

This invention relates to apparatus for vacuum transfer of containers and more particularly to apparatus for separation of misaligned containers from properly aligned containers by transferring only the properly aligned containers. Also, a vacuum transfer belt is provided which is very efficient in operation and has lower power requirements.

BACKGROUND ART

More and more operations in the manufacture and packaging of goods require a sensitive means of detecting and removing out-of-specification, cans, containers, cartons, packages and the like. The items to be removed may not be within certain weight limits, size, position, or shape to pass a particular test. With the rapidity that the modern machines have to run to satisfy production requirements, the usual visual methods of screening is not satisfactory.

In the past, vacuum devices have been used to automatically detect and reject downed cans. With devices of this type, a vacuum is applied to the open upper end of upright cans to hold the cans against a moving conveyor, while the downed cans will not be held against a vacuum mechanism and are rejected to a collection station.

One such prior art device is disclosed in U.S. Pat. No. 4,146,467 to Sauer, et al. wherein a pair of endless belt conveyors are spaced apart longitudinally to convey cans in an upright position. The upright cans are transferred from one conveyor to the other by a vacuum transfer mechanism which is located above the adjacent ends of the conveyors. The transfer mechanism includes an endless perforated belt that travels across the open bottom of a plenum housing which is divided into a series of chambers. The chambers are subjected to a vacuum which acts to attract and hold the upright cans against the perforated belt so that the cans can be transferred by movement of the belt from one conveyor to the other, while downed cans are rejected from the conveyor system. A central chamber is subjected to a lesser vacuum than the remaining chambers, and as the cans move across this central chamber, cans with damaged upper flanges will fall from the belt to a collection site since they do not have a sufficient effective contact area to be supported by the lesser vacuum.

Another device is disclosed in U.S. Pat. No. 4,136,767 to Sarovich, which is directed to the use of a vacuum transfer apparatus to move cans from a feed-in can conveyor in an inverted position to an upper conveyor in upright position by means of a perforated endless can-carrying and can-uprighting conveyor belt which works over the peripheral surface of a rotary foraminous metal cylinder or drum. Vacuum is applied from a vacuum chamber or housing and a first vacuum control device to the perforated endless conveyor belt which lifts the cans off the feed-in can conveyor belt, whereupon the perforated endless conveyor belt grabs and holds the cans with the closed bottoms of the cans disposed against the perforated endless conveyor belt, around approximately half of the peripheral surface or circumference of an air-permeable, rotary, foraminous, metal drum or cylinder. When the cans reach the top of the drum or cylinder, the vacuum from the vacuum chamber or housing, acting through a second and upper vacuum control device and the perforated endless conveyor belt, is cut off and the cans are delivered in upright position to a take-away or delivery conveyor by which the cans may be transported to a second work station.

Although the prior art devices have been suitable for their intended purposes, they have certain shortcomings which heretofore have not been overcome. In every instance, the size of the openings through the plenum and the transfer belt is quite large so that the cubic feet per minute (CFM) of air moved through the belt is quite high. At the beginning of a cycle when no cans are on the belt, the openings in the belt are all open so that air is drawn through the belt at very high CFM, whereas the differential static pressure through the ambient air and the plenum is relatively low. As cans are picked up by the belt, an increasing number of holes become closed by the ends of the cans or containers over the belt. As this occurs, the CFM decreases and the air speed increases as the static pressure within the plenum increases. Since the pressure differential is relatively little at the beginning of the cycle, the CFM must be extremely high in order to attract the cans to the belt. Later when a large number of cans are on the belt, the static pressure differential is so great that sometimes cans which are tipped over will be drawn up against the belt rather than being separated from the other cans. Also, the greater air speed created by the much higher pressure differential will cause the air flowing through the space between adjacent cans to create a low pressure between the cans in accordance with Bernoulli's Principle. This can be undesirable where one of these cans is defective or improperly oriented. For example, the bottom of a conventional aluminum can has a chine or taper at the bottom end so that the closed bottom end has a smaller surface area than the open upper top. Thus, a vacuum transfer device can be adjusted so that only cans in the upright position will be attracted to the belt, whereas if the bottom of the can is up the surface area is too small to be held up by the vacuum and therefore is separated at the transfer station from the other cans. On the other hand, where three cans are together, one of them being upside down, if the CFM is sufficiently great, low pressure will be created in the space between the cans in accordance with the Bernoulli Principle so that the third upside down can is carried along with the other two. Thus, effective separation of the cans with the desired orientation from those which are not, is difficult and sometimes almost impossible to obtain.

Additional disadvantages with prior art devices is that the size of the fan must be very great in order to draw sufficient CFM through the transfer belt when the system starts up in order to attract a can to the belt. Thus, the power requirements for the transfer conveyor are excessive.

Additionally, it is often necessary to provide suitable venting devices or pressure regulator devices within the plenum so that the static pressure does not become so great as to collapse the ducting.

Thus, in the prior art devices, the pressure within the plenum is constantly changing, depending on the number of cans on the transfer belt, creating wide variations not only in static pressure within the plenum, but also in CFM through the belt resulting in difficult regulation and control problems.

DISCLOSURE OF THE INVENTION

In accordance with this invention, a vacuum transfer conveyor for transferring selected vertically-arranged containers from a first station, is provided. The transfer conveyor includes a vacuum plenum having a wall with an inner surface and an outer surface spaced above the first station a distance slightly greater than the weight of the containers and extending to the second station. Means are provided for drawing a vacuum in the plenum. A prearranged pattern of air jet openings extending through the plenum wall are sized and positioned so that the vacuum drawing means draws the maximum vacuum in the plenum of which it is capable when all of the openings are uncovered at a flow rate just sufficient to pick up only a properly oriented can at the first station. A foraminous transfer belt having a reach mounted against and movable along the plenum wall from the first station to the second station is provided to transport containers which are picked up by the vacuum from the first station to the second station, the belt having a substantially larger open area than the jet opening so as not to have any appreciable effect on the amount and velocity of air passing through the jet openings.

More particularly, the invention is directed to a conveyor system which is operated with a vacuum chamber or plenum being connected to the intake of a blower which is operated under such conditions that the static, subambient pressure, i.e., vacuum, remains constant within the plenum regardless of whether the plenum intake is opened or closed. This is the maximum negative static vacuum of which a particular blower is capable of drawing.

The conveying system may include a pair of endless belt conveyors which are separated, the first conveyor serving to convey a single line or a mass of cans in an upright condition to a first station and the second conveyor serving to move the container away from a second station. The first and second conveyors may be operated at the same or different speeds. The conveyors may be spaced longitudinally and/or vertically.

The apparatus for detecting and rejecting downed, damaged or otherwise unsuitable containers comprises a transfer mechanism which is located above the first station and extends to the second station. The transfer means includes an endless open mesh or foraminous transfer belt which passes over the bottom end of a housing or enclosure, such as a plenum connected to a source of vacuum, such as a blower. The bottom end of the chamber is provided with a wall that serves as a vacuum plate having a predetermined number of selected size apertures through which air is drawn by the blower. A predetermined amount of negative static pressure or vacuum and the spacing of the conveyor means from the container top are selected to just lift and hold the containers against the belt conveyor. Advantageously, the vacuum or subambient pressure is held constant in the chamber by operating the blower at its maximum capacity. Thus, the static pressure is not only constant, but high and the CFM drawn by the blower through the openings is low. These conditions will remain whether the transfer belt is empty so that all openings in the plenum are unobstructed or it is supporting a lot of containers so that most of the openings are closed. This consistency of vacuum or subambient pressure allows very precise control so that a very slight deviation of a container from normal will cause it not to be picked up by the transfer belt and thus be separated from the containers which are of the desired orientation and condition.

The apparatus of this invention is capable of rejecting downed containers even under those circumstances where a downed container is closely surrounded by upright containers which in prior art devices would be lifted with the upright containers and picked up by the transfer mechanism. This is facilitated by running the transfer belt at a higher speed than the first conveyor to longitudinally space the containers along the transfer belt.

The ends of the containers are positioned in close proximity to the bottom surface of the vacuum plate such that the increased velocity of air passing over the tops of the cans or containers and between the cans and the vacuum plate will result in a reduction in the pressure within the spacing between the vacuum plate and the tops following Bernoulli's Principle and the Coanda Effect which is just sufficient to lift the containers into holding engagement with the belt conveyor.

In an alternative embodiment, a plurality of spaced air jet openings extend through the plenum wall and are arranged in parallel rows extending from above the first station to above the second station. A transfer belt is provided which has a reach mounted for movement along the outer surface of the plenum wall. The belt has a plurality of spaced slots arranged in parallel rows corresponding to and overlying at least one of the rows of jet openings. The slots each have sufficient length to expose a maximum of two jet openings at one time and are spaced apart along each row a distance equal to the length of the slots. Means are provided for moving the transfer belt across the plenum surface from a position above the first station to a position above the second station.

More particularly, the jet openings near the first station are larger than the rest of the jet openings to provide increased air flow at the first station to lift the containers from the first station to the transfer belt. A longitudinal rib is provided on the inside surface of the transfer belt adjacent to each side edge thereof and a longitudinal groove on the outer surface of the plenum wall is provided adjacent each side edge for receiving the respective ribs to form an air seal between the edge of the transfer belt and the plenum wall. The ribs and grooves also serve as a guide to cause the belt to properly track across the plenum wall. The moving means may include rotatable cylindrical members adjacent to each end of the plenum having grooves for receiving their respective V-belts. The unexposed jet opening draws the belt up against the plenum wall as it moves thereacross.

In further alternative embodiment, additional rows of jet openings are provided between the rows which correspond with the rows of slots in the belt. These jet openings also assist in holding the belt against the plenum wall. The belt may have a splice to join the ends thereof which is thicker than the belt and has air spaces along its length. The additional rows of holes provide additional flow of air through the splice which assists in holding a container which extends across the splice onto the belt even if its peripheral edge is not in contact with the belt around its entire circumference.

In a still further alternative embodiment, the plenum wall is provided with longitudinal parallel slots which are aligned with parallel rows of jet openings in the belt. Additionally, pick-up slots are provided at the upstream end of the plenum wall which are limited in length and are spaced between the transfer slots. Additional rows of jet openings on the transfer belt align with each of these slots. Thus, at the upstream end, a greater volume of air will be provided due to the presence of the pick-up slots to pick up a container so that it can be transferred by the transfer belt to the downstream end. However, once the container is transferred beyond the end of the pick-up slots a lesser number of jet openings will be positioned over slots to provide a transfer vacuum for the container. Thus, if the container is damaged or deformed in any way around its peripheral opening it will drop from the conveyor so that only containers in good condition will be transferred to the downstream end for further processing.

Any of the previously descried transfer belts, when run at a higher speed than the conveyor at the upstream location, can be used to not only accomplish separation of improperly oriented containers, but to also place these containers into single file. By operating the vacuum belt at a higher speed than the conveyor at the upstream location, the containers will be longitudinally separated, as previously described. At the downstream location, a conveyor can be provided for carrying the containers away from the vacuum transfer device wherein the conveyor has converging sidewalls to move the longitudinally spaced containers together in a lateral direction and ultimately into single file over a relatively short path.

Other advantages of this invention will become apparent from the following description taken in conjunction with the accompanying drawings.

BEST MODE FOR CARRYING OUT THE INVENTION

Figure 1:
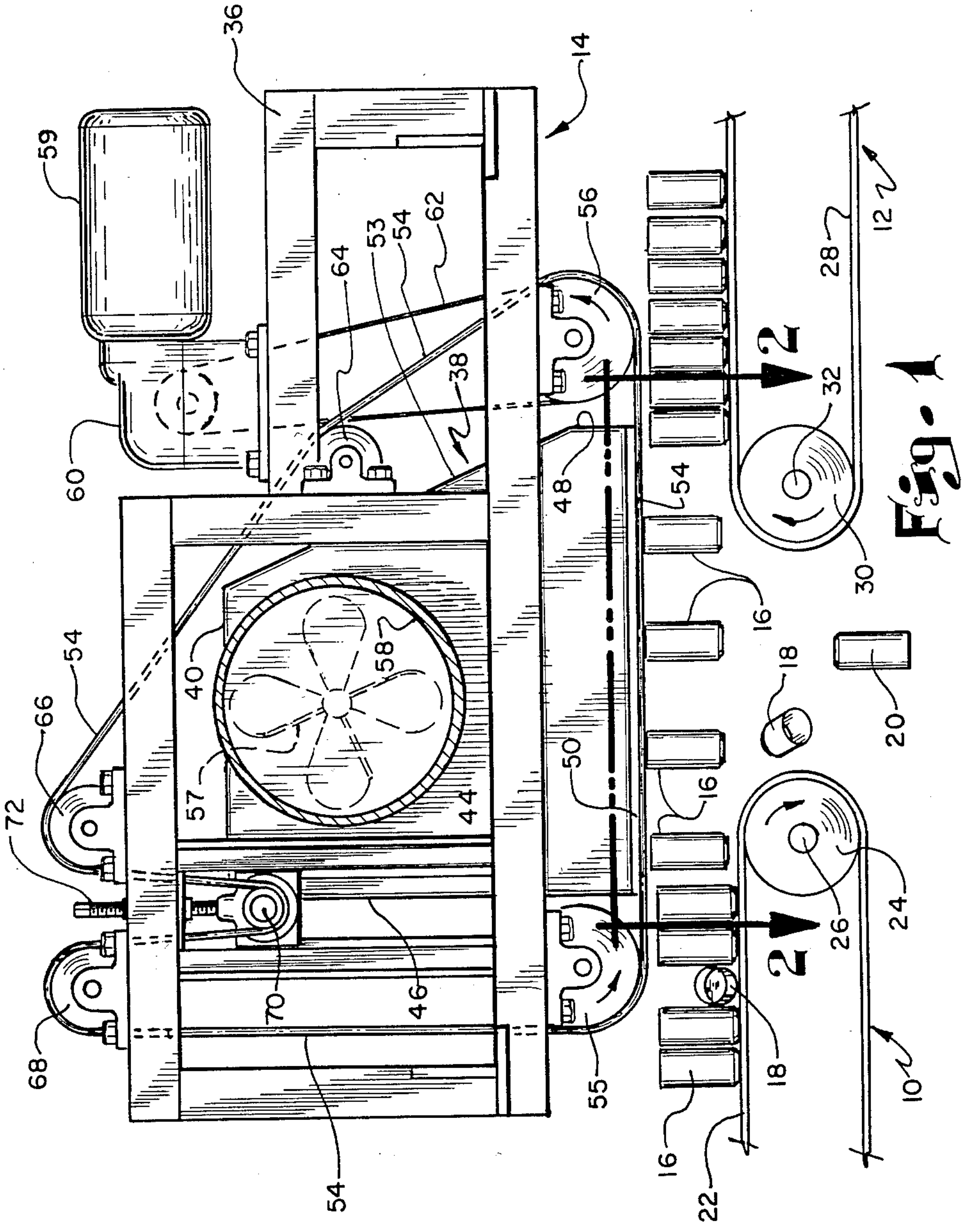
FIG. 1 is a side view in elevation of a preferred embodiment of the vacuum transfer conveyor of this invention.

Referring to FIG. 1, there is shown one illustration of how a preferred embodiment of the present invention is implemented. The conveying system includes an upstream conveyor 10 and a downstream conveyor 12. The upstream conveyor and the downstream conveyor are longitudinally spaced apart in the direction of travel of the conveyors. A vacuum transfer conveyor apparatus is positioned above the adjacent ends of the conveyors 10 and 12 and functions to transfer a plurality of upright cans 16 from the first upstream conveyor 10 to the second downstream conveyor 12. Downed cans 18 and inverted cans 20 will fall off of conveyor 10 to be collected and recycled or discarded.

Conveyor 10 may be a conventional link belt conveyor and include a porous endless link belt 22. The belt 22 travels over a plurality of spaced rollers, including end roller 24, as shown, which is journaled on shaft 26. One of the rollers can be driven by suitable means, not shown, to move the belt 22 in an endless path to deliver the cans to a first station where the properly oriented cans are picked up by transfer apparatus 14, as explained below.

The second, downstream conveyor 12 is of similar construction to conveyor 10 and includes an endless link belt 28 which is supported by rollers, such as roller 30, journaled on shaft 32 for conveying the cans from a second station, where the cans are dropped off of the transfer apparatus to be carried to the next work station. Although conveyors 10 and 12 are illustrated as belt conveyors, it will be understood that either or both could be of the air conveyor or air table type as disclosed in my U.S. Pat. No. 4,347,022, issued Aug. 31, 1982 for "Air Table System".

Figure 2:
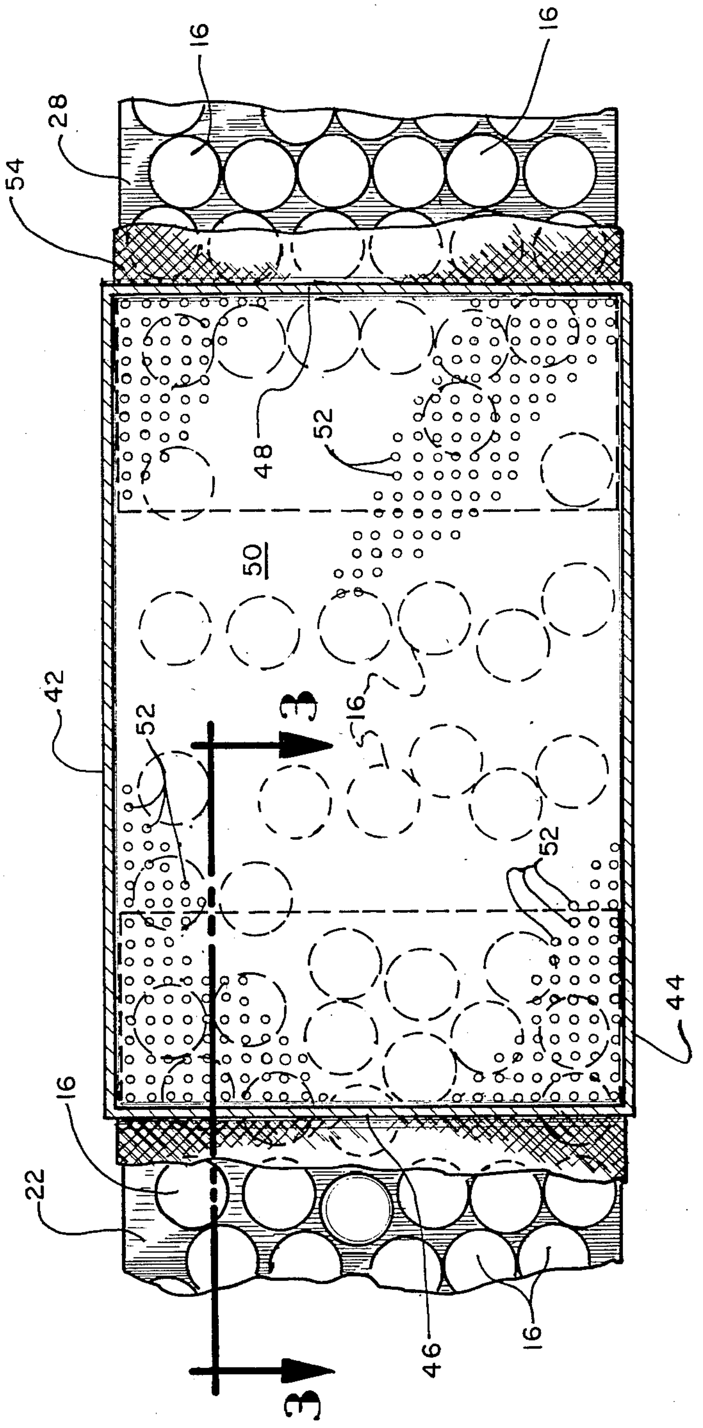
FIG. 2 is an enlarged, horizontal section, taken along line 2—2 of FIG. 1, showing details of the vacuum plenum.

The transfer mechanism 14 includes a frame 36 supporting a closed chamber or plenum 38 including a top wall 40, shown in FIG. 1, and a pair of side walls 42 and 44, a pair of end wall 46 and 48 and a bottom wall 50 provided with a plurality of apertures 52 therethrough which serve as vacuum jets, as seen in FIG. 2. Advantageously, a sloping wall 53 joins top wall 40 and end wall 48, as shown in FIG. 1. The side wall 44 is provided with an outlet opening 58 to which is connected a blower 57, shown in dotted lines in FIG. 1. It will be understood that blower 57 may be mounted at any suitable location exteriorly of plenum 38 and connected thereto through opening 58.

The transfer mechanism 14 includes a porous foraminous belt, such as link belt 54 which has a reach mounted for movement across and adjacent to plenum wall 50 between an idler roller 55 and a drive roller 56. The drive roller is driven as by motor 59 through a gear box 60 and a belt or chain 62. The transfer belt 54 also rides on idler pulleys 64, 66, 68 and take-up pulley 70 having means, such as a screw 72, to move the pulley 70 up or down to shorten or lengthen the belt 54 to provide the desired tension thereon.

Figure 3:
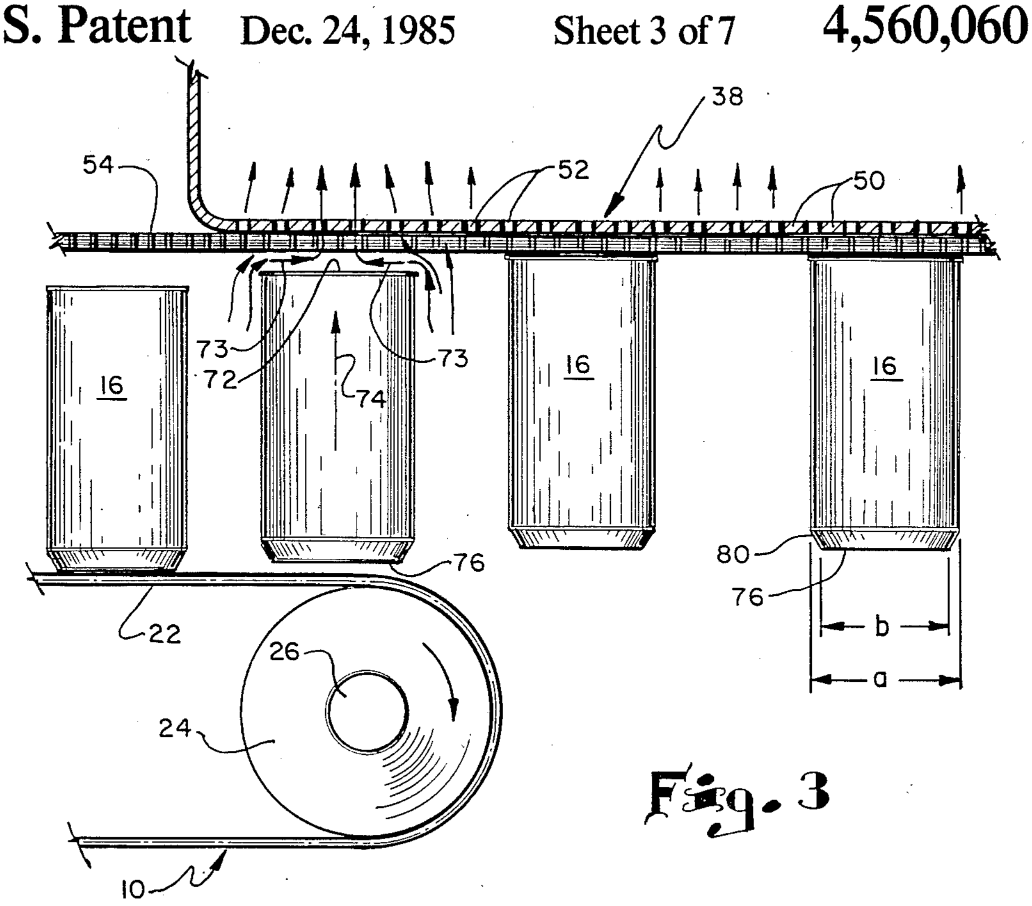
FIG. 3 is an enlarged, fragmentary section, taken along line 3—3 of FIG. 2, showing how the containers are lifted up to the transfer belt.

According to the present invention, the air, as shown in FIG. 3, moves over the top edges 72 of the containers 16 at the first station at the discharge end of conveyor 10 at a high face velocity in the direction of arrows 73. This results in a lowered pressure being developed between the top edges 72 of the containers 16 and bottom wall 50 of plenum 38 to lift the container in the direction of arrow 74 as a result of the Bernoulli Principle wherein an increase in velocity of a gas results in a lower pressure and the Coanda Effect wherein the tendency of a jet of gas to follow the wall contour when discharged adjacent to a surface, even when that surface curves away from the jet discharge axis, is accompanied by entrainment of air surrounding the wall, and thus reduces the pressure above it. By utilizing these principles to lift the cans onto the transfer belt, the vacuum drawn by the plenum need be only sufficient to hold the cans on the belt during transfer and not sufficient to also provide all of the lifting force to lift the cans off of belt 22.

Thus, with the present invention, the apertures are sized and spaced so as to support the cans when blower 57 draws maximum vacuum in plenum 38. In this way, the amount of air passing through vacuum jets or apertures 52 is the same whether no apertures are covered by cans or whether all of the apertures are covered by cans because the differential pressure between the ambient air and the plenum remains the same.

It can be understood from viewing FIG. 3 that in a conventional aluminum or steel container or can, the bottom surface 76 has a diameter b, which is less than the diameter a of the top edge 72 of the can because of the taper or chine 80. Thus, by adjusting the number of apertures in wall 50 with respect to the vacuum within plenum 38 so that an upright can will just be supported by the belt, it will be apparent that if a can should be supplied to the transfer belt in an inverted position with the bottom 76 up, the amount of openings available to draw a vacuum on this area will be less and therefore, the inverted cans cannot be supported by the transfer belt 54 thereby separating them from the properly oriented cans.

Figure 4:
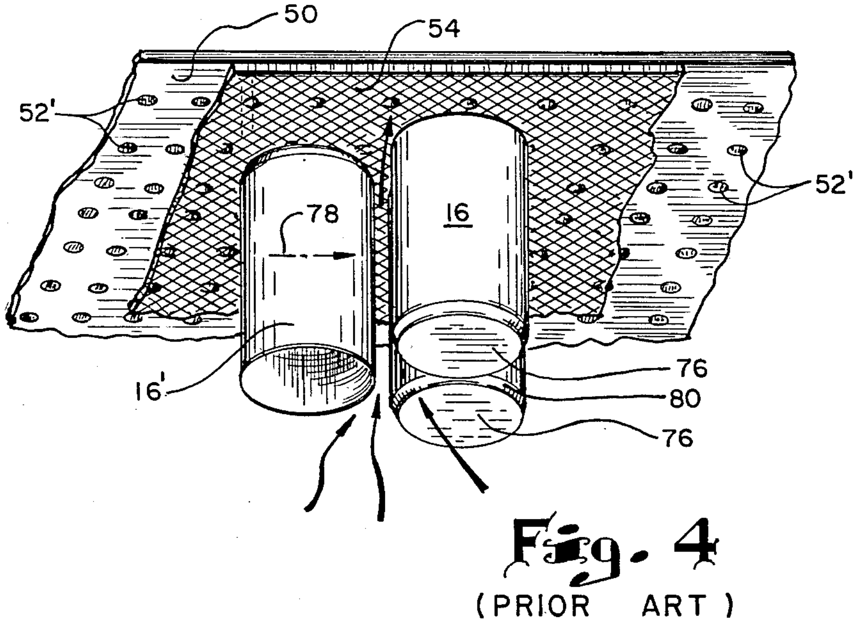
Fig. 4 (PRIOR ART)
FIG. 4 is an enlarged, fragmentary perspective view, in accordance with the prior art, showing how an improperly aligned container can be held and carried along with two properly aligned containers.

Referring to FIG. 4, a common problem with the prior art devices having large openings 52' in bottom wall 50 is that when two cans 16 are in side to side contact and a third inverted can 16' is positioned near the intersection of cans 16 so as to generally form a triangle, the Bernoulli Principle and Coanda Effect will act to create a partial vacuum in the space between the three cans so that can 16' will be drawn toward the other two cans in the direction of arrow 78 and held thereagainst and supported by these cans so as to be carried along by transfer belt 54. In other words, the vacuum from the plenum together with the supporting force caused by the partial vacuum between the cans will hold inverted can 16' so that it is carried along with cans 16 across the transfer mechanism when, in fact, the can should have been discarded. This occurs when large openings 52' are used so that a high volume of air passes through the holes tending to draw the cans up against the transfer belt in the prior art devices. Thus, when the opening to the plenum is substantially unobstructed this mass flow of air will create a partial vacuum in accordance with the Bernoulli Principle and Coanda Effect.

On the other hand, with the present invention, the flow of air is substantially less and therefore a finer sensitivity concerning the support of containers by the transfer belt 54 is obtained so that the chance of carrying an improperly oriented can across the transfer station is minimized.

In one preferred embodiment of the present invention, the belt 54 of the transfer mechanism is run at a substantially faster rate of speed, as much as twice the speed of belt 22 of upstream conveyor 10. This is to provide longitudinal spacing between the containers picked up by the transfer belt 54 to further minimize the difficulties described with respect to FIG. 4. Furthermore, if a down container 18 is present, by the faster running of belt 54, the longitudinal spacing of containers 16 will allow the downed container 18 to fall free and drop as shown. The discharge conveyor 12 can be run at the same or a different speed than the transfer unit. If the outlet conveyor is set to travel at the same speed as the inlet conveyor, the containers will be returned to the same pattern as when they left the upstream conveyor.

Furthermore, since the system always operates at a constant vacuum and at maximum static pressure rather than having to accommodate a wide range of air flow and static pressure as in the prior art, a much smaller blower and motor may be used. This can be exemplified by reference to the table below in conjunction with the following description. This table is for a Size 123 fan having a 12.25 inch diameter and a fan outlet area of 0.86 square feet.

Size 123 Fan Chart (Partial)

| | ½" SP | | 1.5" SP | | 4" SP | | 5" SP | |
|---|---|---|---|---|---|---|---|---|
| CFM | RPM | BHP | RPM | BHP | RPM | BHP | RPM | BHP |
| 1203 | 1652 | 0.19 | 2071 | 0.44 | 2885 | 1.16 | 3175 | 1.51 |
| 1289 | 1735 | 0.22 | 2142 | 0.48 | 2925 | 1.23 | 3206 | 1.58 |
| 1375 | 1821 | 0.25 | 2216 | 0.52 | 2970 | 1.31 | 3237 | 1.65 |
| 1547 | 1989 | 0.32 | 2367 | 0.62 | 3075 | 1.46 | 3327 | 1.84 |
| 1719 | 2164 | 0.41 | 2520 | 0.73 | 3193 | 1.63 | 3430 | 2.03 |
| 1891 | 2342 | 0.51 | 2680 | 0.86 | 3323 | 1.83 | 3545 | 2.24 |
| 2063 | 2520 | 0.62 | 2842 | 1.01 | 3466 | 2.05 | 3680 | 2.49 |
| 2235 | 2702 | 0.76 | 3009 | 1.17 | 3608 | 2.28 | 3814 | 2.75 |
| 2407 | 2885 | 0.91 | 3175 | 1.36 | 3755 | 2.53 | 3959 | 3.03 |

In the prior art, if one determined that a particular design required 2407 cubic beet of air (CFM) to operate his system and he wanted a ½ inch static pressure (SP) at the plenum openings he can refer to the chart to determine that he needs to operate the fan at 2885 revolutions per minute (RPM) with all the plenum openings clear, i.e., when none are covered by cans. Now, if the openings are restricted about one-half, as by covering the belt with containers, following the chart up to 1203 (CFM) and going to the right unit the 2885 RPM is read, the static pressure (SP) will have increased from ½ inch to 4 inches, or by a factor of eight.

By way of a second example, if a static pressure of 1.5 inches is desired with air flow of 2407 CFM the Size 123 fan will have to operate at 3175 RPM. Again, if cans cover approximately half of the holes so that the CFM drops to 1203, then 5 inches of static pressure will be drawn in plenum 38. The results of this is a dramatic increase in the face velocity of the air passing through the vacuum jet openings 52. As a result, misaligned cans can be carried by the transfer belt across the transfer station defeating the purpose of the machine.

Another way of viewing this same problem and the dramatic differences between the apparatus of the present invention and the prior art is to consider the cubic feet per minute required to operate the system of the present invention as compared to that of the prior art. In system of this invention, if a vacuum of 3.5 inches of water is drawn in the plenum through ⅛ inch holes having a spacing of ½ inch on center, each hole will draw 0.6723 CFM at a face velocity of 7,900 feet per minute. This hole spacing provides 576 holes per square foot arranged in parallel rows. If the plenum wall is 19 inches by 14 inches, i.e., 1.85 square feet, it will have a total of 1,131 holes and will draw 760 CFM. Because of the relatively small size of the holes, even if the belt 50 has only 50% open mesh, virtually all of the holes will be open unless they are covered by a can. If a can is a standard 211/413 12 oz. aluminum can, it weights 14.2 grams. When the can is in the upright position as shown in FIG. 3, the top edge 72 of the can will cover an average of 23.7 holes. By providing a spacing of 3/16 inches between the upper edge 72 of the cans and the belt 54, the Bernoulli Principle and Coanda Effect will be effective to at least partially lift the cans from belt 22 to belt 54.

By comparison, if larger holes and lower static pressure is provided as in the prior art, such as ½ inch holes at a static pressure of ½ inch, it can be determined that the face velocity is 2,828 feet per minute. This is calculated by multiplying the square root of $\frac{1}{2} \times 4{,}000$ feet per minute, the face velocity of a 1 inch hole. With a 50% open mesh belt, it could be assumed that the effective square feet is ½ of 1.85 square feet of 0.925 square feet. Thus, by multiplying 2,828 feet per minute × 0.925 feet, we can see that the air flow is 2,6,16 CFM as compared to 760 CFM in applicant's invention. One of the things that this additional flow of air means, is that the Bernoulli Principle and the Coanda Effect will create the situation shown in FIG. 4 with respect to three adjacent cans, where one is in an inverted position. Additionally, cans which are laying sideways on the belt, such as can 18 of FIG. 1, can also be picked up due to the high CFM generated. Furthermore, because of the chine near the lower end of the can, the bottom diameter of the can is approximately 2 inches, whereas the top is 2¾ inches. In this regard, the area of a 2 inch diameter can bottom is 3.1416 square inches and the area of a 2¾ inch diameter can top is 5.9396 square inches, an increase in area of 89 percent. With applicant's invention with the hole size described in the example, this makes an average difference in the number of holes holding the top of the can, i.e., 23, as compared to 12 holes holding the bottom of the can if an inverted can is in position. In other words, there is almost twice as many active jet openings working on the the top of the can as compared to the bottom of the can. On the other hand, in the prior art example given with 1 inch holes, the differential number of holes is considerably less with respect to the top of the can and the bottom of the can.

Figure 5:
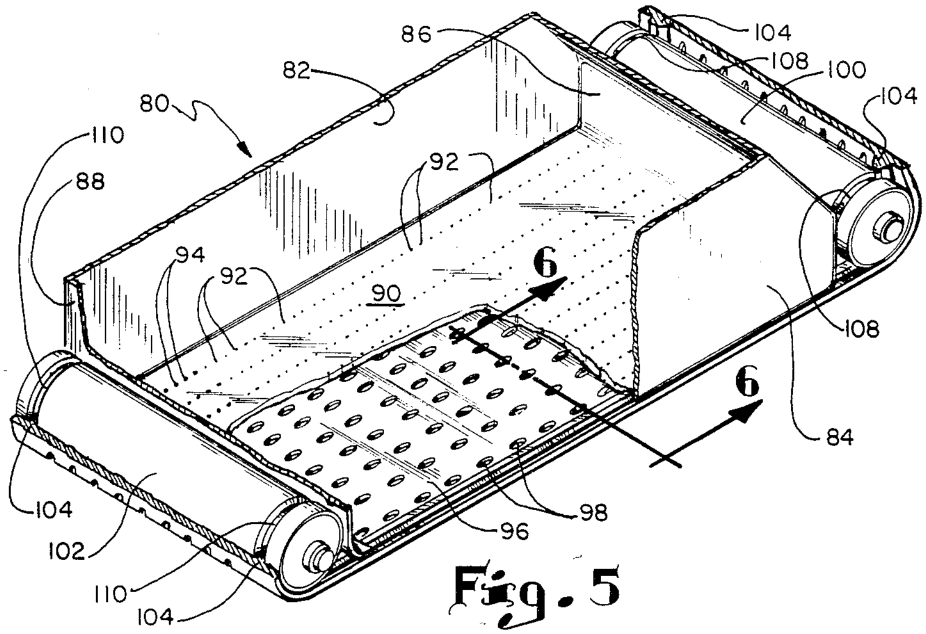
FIG. 5 is a fragmentary perspective view, showing an alternative plenum and belt arrangement wherein the plenum has spaced parallel rows of jet openings and the belt is provided with corresponding rows of slots for sequentially exposing and covering the jet openings.
Figure 6:
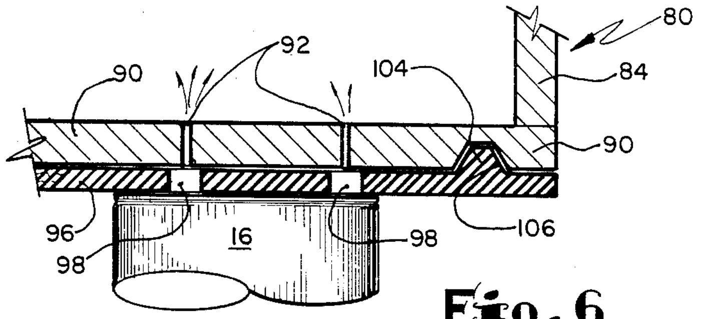
FIG. 6 is an enlarged, horizontal section, taken along line 6—6 of FIG. 5, showing further details of the plenum and vacuum belt construction and showing a container being supported by the belt.
Figure 7:
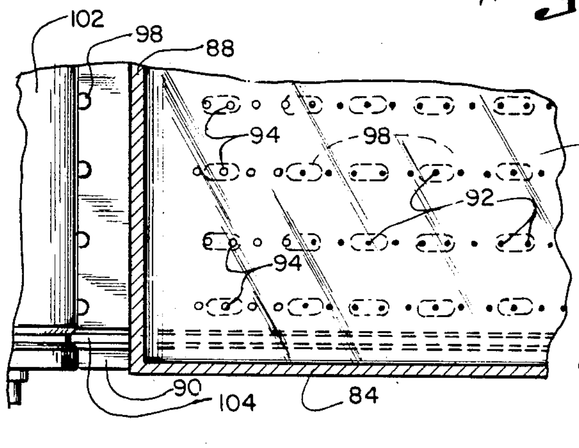
FIG. 7 is a fragmentary top plan view of a corner portion of the plenum wall of FIG. 5 showing the relationship between the jet openings and the belt slots.

An alternative construction is shown in FIGS. 5–7 wherein a plenum 80 is provided having side walls 82 and 84 interconnected by end walls 86 and 88. The plenum also includes a bottom wall 90 which is provided with longitudinal spaced parallel rows of jet openings 92. Somewhat larger jet openings 94 are provided at the upstream end of bottom wall 90 in each row, as will be more fully discussed below. An endless vacuum belt 96 is provided which moves from the upstream end to the downstream end across bottom wall 90 and plenum 80 and has parallel spaced rows of longitudinal apertures in the form of slots 98 which are aligned with jet openings 92 and 94 to sequentially cover and expose them. Conveniently, when a vacuum is drawn on plenum 80, the openings 92 and 94 which are covered by the belt 96 will cause it to be drawn up tightly against the plenum, whereas the openings which are uncovered by virtue of being above the slots will draw a vacuum to lift and support cans to be moved with the reach of belt 96 from the upstream end to the downstream end.

The belt is pulled across plenum wall 90 by a drive roller 100 at the downstream end of the plenum and also runs over an upstream idler roller 102. Conveniently, vacumm belt 96 is provided with a longitudinal rib 104 adjacent each edge which is received in a corresponding groove, such as groove 106 in wall 90, as best seen in FIG. 6. Conveniently, drive roller 100 is provided with spaced grooves 108 for receiving ribs 104 to enhance the pulling power of the drive roller. Also, idler roller 102 is provided with grooves 110 also corresponding in spacing to ribs 104. By this arrangement, the belt will be positively guided along the proper path. The rib 104 and groove 106 in plenum wall 90 provide the dual or secondary function of serving as an air seal so that air does not leak in between the sides of the plenum wall and the belt.

By way of example, let us assume that the cans to be conveyed are aluminum cans weighing approximately 14 grams and having an upper end diameter of 2½ inches and are to be conveyed across a vacuum plenum plate 90 which is 14½ inches wide and 20 inches long. The first four holes 94 in each row will be 13/64 inches on ⅝ inch centers and the rest of the holes in each row will be 5/64 inch holes on ½ inch centers, the rows of slots being spaced 1¼ inches apart so as to correspond with the spacing of the holes and travel over the respective rows of holes. By this arrangment, no matter where a container is picked up by the belt, at least one hole will be exposed through a slot to the can and will provide sufficient vacuum for lifting a container if it is under holes 94 and to support a container if it is under one of holes 92.

With the dimensions given, there will be eleven rows of holes and, thus, 44 larger holes 94 and 396 smaller holes 92. If a 4 inch vacuum is drawn, each larger hole will pass 1.80 CFM of air for a total of 79.2 CFM for all holes. Similarly, these smaller holes 92 will each draw 0.1627 CFM for a total of 64.4 CFM. Thus, the total CFM for the entire system with all holes open would be 143.6 CFM. However, because the belt covers the holes, only a maximum of approximately 60% of the holes can be open when the belt is completely empty of cans. Thus, the most air that can be drawn at one time is 60% of 143.6 CFM, or 86.16 CFM. Thus, the air usage is very small which in turn makes the power requirements very low. It is contemplated that a one-third horse power motor used with a Grainger 2C-820 fan is capable of producing 160 CFM at 5.0 static pressure is adequate for the operation of this apparatus, as previously described.

Figure 8:
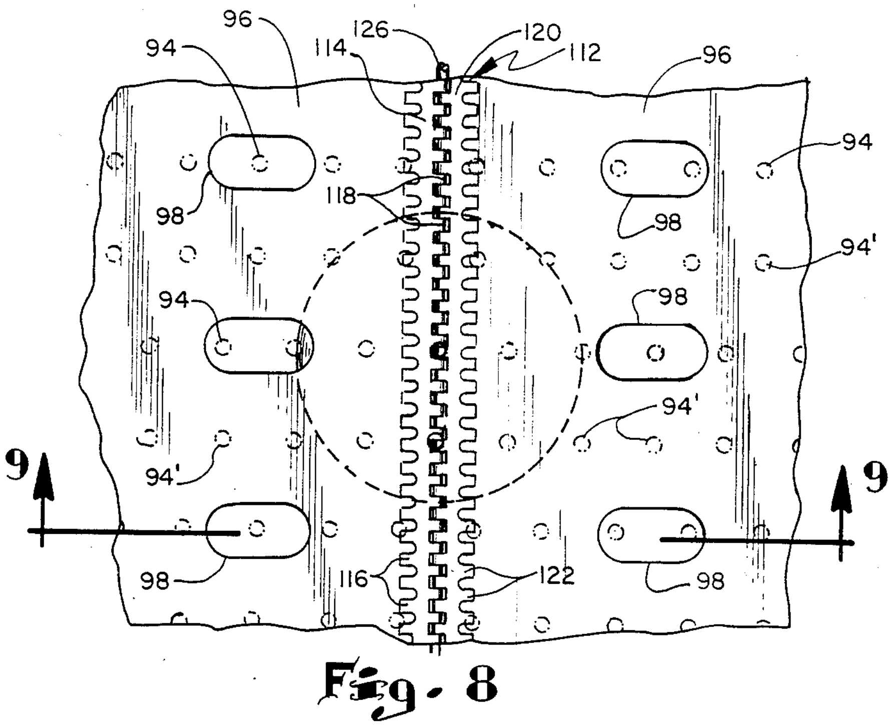
FIG. 8 is a greatly enlarged, fragmentary top view of the transfer belt of this invention showing in phantom, an alternative arrangement for the jet openings and their cooperation with the belt splice to retain a container over the splice.
Figure 9:
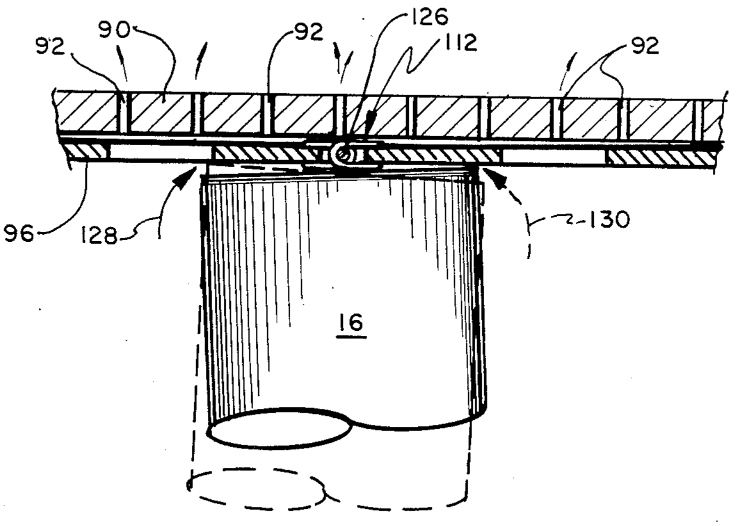
FIG. 9 is a horizontal section, taken along line 9—9 of FIG. 8, further showing the positioning of a container under the splice.

Additional features of this invention are shown in FIGS. 8 and 9 wherein the ends of belt 96 are joined, as by a splice 112 in the form of a piano hinge, to form the endless belt. Splice 112 includes first hinge plate member 114 extending across one end of the belt and attached thereto, as by spaced cleats 116. A plurality of knuckles 118 extend from the opposite side of hinge plate 114. Splice 112 includes a second hinge plate 120 having cleats 122 connected to the other end of belt 96 and also having knuckles 124 extending from the other side which interlace with knuckles 118 and have an opening therethrough for receiving a hinge rod 126. As can clearly be seen in FIG. 8, there are air spaces between the knuckles 118 and 124 which will permit extra air to be drawn through the plenum at the location of the hinge as it moves across the surface of the plenum. In other words, any air jet openings 94 which align with the splice will draw air. As shown in FIG. 9, a can 16 will not be drawn flush against the belt at splice 112 because the splice is thicker than the belt. Thus, the container will tend to wobble and additional air can be drawn in around the base created between the upper edge of the can and the belt. Thus, if the vacuum is not sufficient, the can will not be retained, but will fall from the belt.

In order to be sure that enough air is drawn through the spaces between knuckles 118 and 124 along splice 112, an additional row of jet openings 94' is provided between each row of holes 94. As previously pointed out, jet openings 94 in each alternate row are staggered. Similarly, jet openings 94' are staggered in the same relationship as the rows containing jet openings 94. The jet openings 94' serve to draw the belt up against the bottom of platen 90 and normally are never exposed to atmosphere. However, when splice 112 passes over them, they will draw air through the openings between knuckles 118 and 124 and therefor, will provide additional air flow and vacuum for supporting a container 16 which is positioned over the hinge in addition to the air provided through the opening or openings 94 that are exposed through one of slots 98. Thus, the openings in the hinge actually provide means for drawing additional air through additional openings to assure that the container 16 is carried along with the belt even though it is positioned under the hinge and can tilt back and forth as illustrated in FIG. 9. Also, additional air can be drawn in and around the lip of the can bringing into effect Bernoulli's Principle which will cause the can to tend to be drawn up against the belt. The air may follow the path indicated by either arrow 128 or 130, depending upon the tilt of the container.

Figure 10:
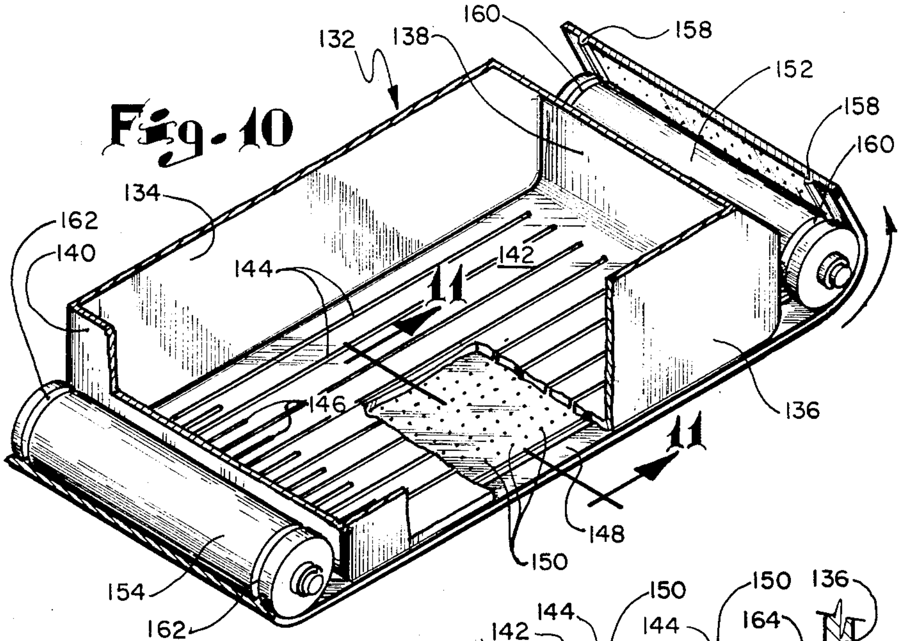
FIG. 10 is a fragmentary perspective view, similar to FIG. 5, but showing a further alternative plenum and belt arrangement wherein the plenum has spaced parallel pick-up and transfer slots and the belt is provided with corresponding rows of jet openings aligned with those slots.
Figure 11:
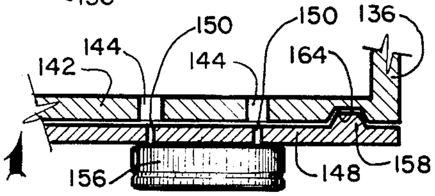
FIG. 11 is an enlarged, horizontal section, taken along line 11—11 of FIG. 10, showing further details of the plenum and vacuum belt construction and showing a container being supported by the belt.
Figure 12:
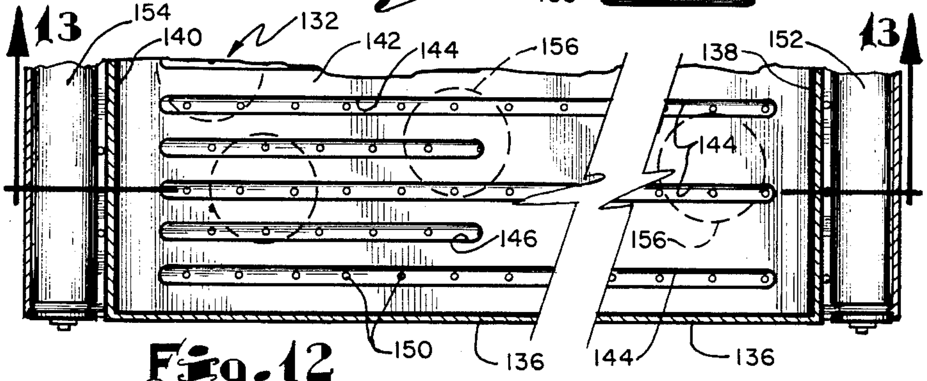
FIG. 12 is a fragmentary, enlarged, top plan view of a portion of the plenum wall of FIG. 10 showing the relationship between the jet openings in the belt and the plenum wall slots.

A still further alternative embodiment as shown in FIGS. 10–13 wherein a plenum 32 has spaced side walls 132 and 136 interconnected by end walls 138 and 140. A bottom wall 142 is provided which has spaced parallel transfer slots 144 extending from one end thereof to the other, as best seen in FIGS. 10 and 12. Spaced between, or interlayed with, each pair of transfer slots 144 are pick-up slots 146 which are adjacent the upstream end of wall 142. Conveniently, a vacuum transfer belt 148, having parallel spaced rows of jet openings 150, extends across plenum wall 142 between a drive roller 152 and an idler roller 154. The rows of jet openings 150 are spaced so that one coincides with each transfer slot 144 and each pick-up slot 146.

One advantage of this arrangement is that the jet openings on the vacuum belt can be spaced closely together so that rather small articles 156, such as bottle caps can be conveyed by this systems. It is important that during the transfer operation that at least one jet opening be available to each article being conveyed so as to hold it against the surface of belt 148. At the upstream end, the pick-up slots 146 effectively double the air flow thereby increasing the flow of air so that the Bernoulli Principle and Coanda Effect will be effective to at least partially lift the articles from the upstream belt, such as belt 22 of FIG. 1.

Figure 13:
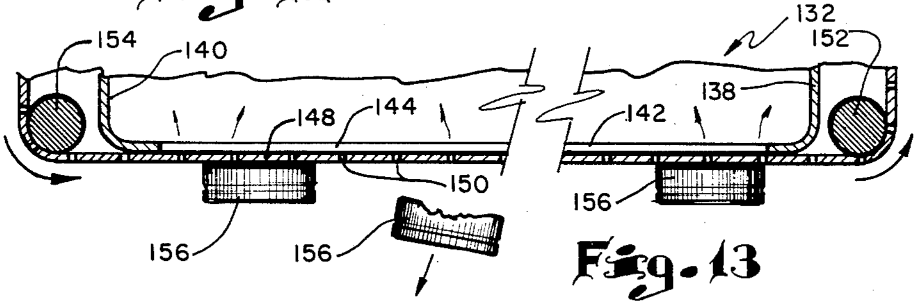
FIG. 13 is a horizontal section, taken along line 13—13 of FIG. 12, showing how containers are transferred and selectively separated by the transfer belt.

As will be apparent, at the upstream end of belt 148, 100% of the openings will be exposed since there is either a transfer slot 144 or a pick-up slot 146 over every row of openings. However, beyond the downstream ends of pick-up slots 146, the number of openings will decrease by 50% which is sufficient to hold articles which are properly formed. However, any malformed articles will drop off the belt, as best seen in FIG. 13. Thus, this vacuum transfer device can be used to transport rather small light-weight articles, whereby any malformed articles can be eliminated. Also, if the belt speed is increased above that of the upstream belt, the articles can be separated longitudinally to reduce any bridging effect wherein the malformed article would be carried by two adjacent articles, as previously discussed with respect to FIG. 4.

As in the embodiment of FIGS. 5–7, belt 148 can be provided with ribs 158 adjacent each edge which are received in grooves 160 adjacent each end of drive roller 152 and grooves 162 adjacent each end of idler roller 154 as well as grooves 164 in plenum wall 142, best seen in FIG. 11. This provides a tight air seal so that air is pulled into the plenum only through jet openings 150.

Figure 14:
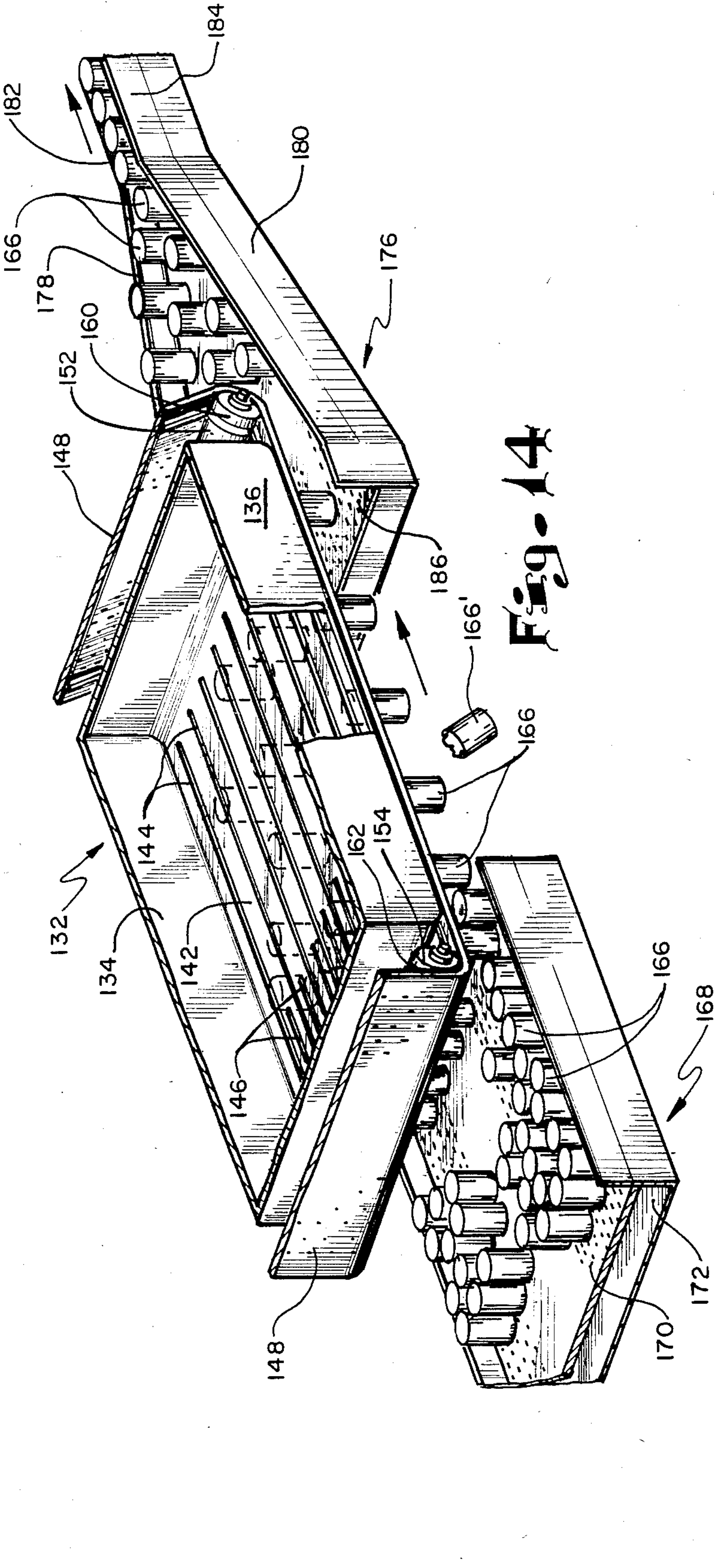
FIG. 14 is a perspective view of a vacuum transfer device of this invention used in conjunction with a vertical single filer.

An alternative embodiment is shown in FIG. 14 wherein the vacuum transfer device of FIGS. 10–12 is utilized in connection with other apparatus, as described below, for transferring a mass of cans from an upstream location to a downstream location wherein they are arranged in a single file. It will be understood that the vacuum transfer devices of the other embodiments could also be utilized for this purpose, the embodiment shown being for illustrative purposes only.

Containers 166 can be supplied en masse at an upstream location, as by means of an air table 168 of the type having a jet board 170 through which air is applied by means of a plenum 172 to convey the containers in a large mass to transfer conveyor 132. The containers 166 will be carried by the transfer belt 148 to a downstream conveyor 176. Conveniently, transfer belt 148 operates at sufficient speed to provide longitudinal separation of the containers as shown. Also, any containers which are bent or misshapen, such as container 166' will be dropped from the transfer belt, as previously described with respect to the other embodiments. Advantageously, downstream conveyor 176 has converging sidewalls 178 and 180 which cause the longitudinally separated containers 166 to be moved toward each other so as to be brought into single file between parallel walls 182 and 184. Conveyor 176 has also been illustrated as an air table having a jet board 186, but it will be understood that other types of conveying apparatus could be used.

Because of the longitudinal separation of the containers by vacuum transfer belt 148, the angle of sidewalls 178 and 180 can be much sharper than other single file conveying devices, such as in my above-mentioned U.S. Ser. No. 533,225, filed Sept. 19, 1983. Thus, the total length of the single filing apparatus, which includes the vacuum transfer portion can be significantly shorter. Of course, the angle of sidewalls 178 and 180 will be designed, as described in my above-identified co-pending application, so as to bring the containers into an isosceles triangular configuration so that they will advance smoothly and can be accelerated into single file arrangement, all is described in the co-pending application.

From the foregoing, the advantages of this invention are readily apparent. A vacuum transfer apparatus has been provided which operates at a high and constant subambient static pressure. The plenum in which this static pressure is drawn has a bottom wall which has vacuum jets or openings of very small diameter so that air is drawn through the vacuum jets at a relatively low CFM. This greatly minimizes the possibility that cans that are not properly oriented, such as being turned upside down or laying sideways on the upstream conveyor belt will be picked up. On the other hand, because of the very high face velocity of the openings, and by spacing the top of the cans at the upstream conveyor very close to the transfer belt, the pick-up of the cans will be obtained by the partial vacuum due to Bernoulli's Principle and the Coanda Effect.

In an alternative embodiment, additional rows of jet openings in the plenum wall are provided between the rows of jet openings over which the slots of the transfer belt pass. These additional vacuum jets are provided to hold the belt firmly against the plenum wall. These additional jet openings also provide the dual function of drawing air through the openings in the belt splice so that any containers which are carried by the belt at the splice will be held on the belt even though the discontinuity caused by the splice might prevent a complete seal between the belt and the upper peripheral edge of the container.

By reversing the slots and jet openings so that the jet openings are in the belt and the slots are in the plenum wall, the jet openings may be placed much closer together to accommodate smaller articles, such as bottle caps, so that at the pick-up end of the belt 100% of the jet openings are exposed whereas downstream 50% will be exposed. This provides a very advantageous arrangement for the pick-up of the light-weight bottle caps yet provides adequate separation of malformed caps during the transfer operation.

In the form of the invention shown in FIG. 14, the vacuum transfer device can serve as a portion of a single filer to permit bringing a mass of containers into single file arrangement over a relatively short longitudinal span. This is accomplished by running the vacuum transfer belt at a sufficient speed to longitudinally separate the mass of containers. The separated containers are then deposited on a downstream conveyor having converging sidewalls which causes the containers to be slid together into single file arrangement for transfer to the next station.

Although the transfer belt has been illustrated as transferring containers along a horizontal path from a first station to a second station, it will be understood that the principles of this invention can be applied to the transporting of the cans along an incline, such as in an elevator or around a curved surface, such as a plenum in the form of a drum. In any event, the principles of this invention can be applied wherein a very low CFM is required for supporting the containers and thus the power requirements required are very low.

Also, it will be understood that in some uses of the present invention it will be desirable to transfer cans which are in an inverted rather than upright position such as cans being transferred from a washing station to a drying station. In that situation, should one of the cans be upright, it will undoubtedly contain some amount of water which will cause it to be too heavy to be held by the belt and thus will be separated from the inverted cans even though the larger end of the can will be adjacent the transfer belt.

It will be understood that although the apertures in the transfer belt in the embodiments of FIGS. 5–9 have been illustrated and described as slots, they may be of any conveniently and suitable shape, such as circular.

The invention has been described in detail with particular reference to preferred embodiments thereof, but it will be understood that variations and modifications can be effected within the spirit and scope of this invention.

I claim:

1. A vacuum transfer conveyor apparatus for transferring selected vertically-arranged containers in random mass from a first station to a second station spaced from the first station, said apparatus comprising:

a vacuum plenum having a wall, with an inner surface and an outer surface, spaced above the first station a distance slightly greater than the height of the containers and extending to the second station;

means for drawing a constant maximum vacuum in said plenum which is uniform from said first station to said second station;

a plurality of spaced air jet openings extending through said plenum wall arranged in parallel rows extending from above the first station to above the second station said jet openings in each row adjacent said first station being larger in diameter than the rest of said jet openings to draw a first greater CFM and air flow velocity at said first station to lift the containers from said first station and to hold each container against said transfer belt and said rest of said jet openings being effective to draw a second lesser CFM and air flow velocity which is just sufficient to continue to hold and transfer containers to said second station;

a vacuum transfer belt having a reach mounted for movement along said outer surface of said plenum wall, said belt having a plurality of spaced elongated slots arranged in parallel rows corresponding to and overlaying at least some of said rows of jet openings, said slots being of sufficient length to expose a maximum of two jet openings at one time and being spaced apart along each row a distance equal to the length of said slots along each row;

a longitudinal rib on the inside surface of said transfer belt adjacent each side edge thereof;

a longitudinal groove on the outer surface of said plenum wall adjacent each side edge thereof for receiving said respective ribs to form an air seal between said edge of said transfer belt and said plenum wall; and means for moving said transfer belt across said plenum surface from a position above the first station to the second station.

2. A single file vacuum conveyor apparatus as claimed in claim 1, further including:

a first conveyor supplying articles en masse at a predetermined speed to said first station;

a second conveyor at said second station and spaced from said first conveyor and having sidewalls converging in the downstream direction for merging the articles into a stream of lesser width; and said belt moving means moves said belt at a higher speed than the movement of articles to said first station to longitudinally space the articles at said second station to facilitate merging of the articles upon engagement with said converging sidewalls at said second conveyor station.

3. Apparatus, as claimed in claim 2, wherein:

said converging sidewalls merge the articles into single file.

4. Apparatus, as claimed in claim 2, wherein:

said belt moves at at least twice the speed at which the articles approach said first station.

5. Apparatus, as claimed in claim 1, wherein:

said ribs each comprises a V-belt.

6. Apparatus, as claimed in claim 5, wherein said moving means includes:

a rotatably cylindrical member adjacent each end of said plenum having peripheral grooves aligned with said longitudinal grooves in said plenum wall for receiving said respective V-belts.

7. Apparatus, as claimed in claim 1, wherein:

said rows of spaced elongated slots overlay every other of said rows of air jet openings;

said belt has first and second ends; and splicing means extends laterally across said belt joining said first and second ends together to form an endless belt, said splicing means having a lateral opening through which air is drawn by said plenum when said splicing means is over said jet openings, said splicing means being thicker than said belt so that the edge of a container supported by said belt over said splicing means cannot sealingly engage said belt around its entire periphery but is held on said belt by the additional flow of air through the additional rows of air jet openings exposed along said splicing means.

8. A vacuum conveyor apparatus for transferring selected vertically-arranged containers which are in a random mass configuration at a first station to a second station spaced from said first station, said apparatus comprising:

a single vacuum plenum having a wall, with an inner surface and an outer surface, spaced above said first station a distance slightly greater than the height of the containers and extending to said second station;

a fan for drawing a constant maximum vacuum in said plenum which is uniform from said first station to said second station;

a first set of multiple rows of parallel transfer slots through said plenum wall extending from said upstream end to said downstream end of said plenum wall, said rows being spaced across said plenum wall;

a second set of multiple rows of shorter pickup slots through said plenum wall interlayed alternately between said rows of transfer slots and extending from said upstream end a short equal incremental distance along said plenum wall toward said downstream end;

a transfer belt having a reach, with a smooth outer surface, mounted for movement along said outer surface of said plenum wall, said belt having a plurality of equally spaced openings arranged in longitudinal parallel and lateral parallel rows, said longitudinal rows corresponding to and overlaying all of said rows of slots in said first and second set of multiple rows, so that a greater number of openings are effective to draw a first greater CFM which is sufficient to lift and hold each of the articles against said transfer belt at said first station and a lesser number of openings are effective to draw a second lesser CFM downstream from the ends of said pickup slots which is just sufficient to continue to hold and transfer the articles to said second station; said openings being sized and positioned so that said fan draws the maximum vacuum in said plenum of which it is capable when all of said openings are uncovered so that said maximum vacuum draws air at said greater desired CFM, which is just sufficient to pickup only properly oriented containers at said first station; and means turning said fan at a constant RPM which causes said fan to draw the maximum vacuum in said plenum of which said fan is capable when all of said openings are uncovered.

* * * * *